(12) United States Patent
Ellmore

(10) Patent No.: US 7,444,672 B2
(45) Date of Patent: *Oct. 28, 2008

(54) SYSTEM AND METHOD FOR SINGLE SIGN ON PROCESS FOR WEBSITES WITH MULTIPLE APPLICATIONS AND SERVICES

(75) Inventor: Kimberly Ellmore, Oakton, VA (US)

(73) Assignee: JPMorgan Chase Bank, N.A., New York, NY (US)

( * ) Notice: Subject to any disclaimer, the term of this patent is extended or adjusted under 35 U.S.C. 154(b) by 249 days.

This patent is subject to a terminal disclaimer.

(21) Appl. No.: 11/350,103

(22) Filed: Feb. 9, 2006

(65) Prior Publication Data

US 2006/0129834 A1     Jun. 15, 2006

(51) Int. Cl.
    *H04L 9/04* (2006.01)
(52) U.S. Cl. .................. 726/8; 726/2; 726/3; 726/4; 705/42
(58) Field of Classification Search .............. 726/2–4, 726/8; 713/182; 705/42
    See application file for complete search history.

(56) References Cited

U.S. PATENT DOCUMENTS

| | | |
|---|---|---|
| 3,705,385 A | 12/1972 | Batz |
| 3,860,870 A | 1/1975 | Furuya |
| 3,896,266 A | 7/1975 | Waterbury |
| 3,938,091 A | 2/1976 | Atalla et al. |
| 4,013,962 A | 3/1977 | Beseke et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |

(Continued)

FOREIGN PATENT DOCUMENTS

CA     2430549     6/2002

(Continued)

OTHER PUBLICATIONS

Kutler, A Different Drummer on the Data Highway, American Banker, Section: No. 91, vol. 160, May 12, 1995, p. 14.

(Continued)

*Primary Examiner*—Minh Dieu Nguyen
(74) *Attorney, Agent, or Firm*—Hunton & Williams, LLP

(57) ABSTRACT

A system and method for integrating the Internet front end-sign on processes of the various systems of a financial institution which allows a customer to view and access its various financial accounts with the institution.

During the initial sign up for the online access, to its accounts, a customer creates his/her User ID and password online during the same session. Once the customer has signed on (password) and verified ownership of at least one account, the system displays all of the customer's accounts that are available for access via the Internet website. The online ownership verification uses only a single account of the customer and the ownership verification criteria associated with the account. The account used for verifying a customer is first determined based on the accounts selected by the customer for accessing online. From the selected accounts, the system of the present invention creates a verification hierarchy with respect to the accounts. When determining the verification to use for the single ownership verification, the present invention selects the account from the hierarchy with the most stringent requirements.

13 Claims, 4 Drawing Sheets

U.S. PATENT DOCUMENTS

| | | |
|---|---|---|
| 4,713,761 A | 12/1987 | Sharpe et al. |
| 4,725,719 A | 2/1988 | Oncken et al. |
| 4,745,468 A | 5/1988 | Von Kohorn |
| 4,799,156 A | 1/1989 | Shavit |
| 4,801,787 A | 1/1989 | Suzuki |
| 4,823,264 A | 4/1989 | Deming |
| 4,882,675 A | 11/1989 | Nichtberger et al. |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,220,501 A | 6/1993 | Lawlor |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,317,683 A | 5/1994 | Hager et al. |
| 5,321,841 A | 6/1994 | East |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,425,102 A * | 6/1995 | Moy .......................... 713/183 |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Change |
| 5,479,530 A | 12/1995 | Nair et al. |
| 5,485,370 A | 1/1996 | Moss et al. |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davis et al. |
| 5,546,452 A | 8/1996 | Andrews |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,197 A | 12/1996 | Chen |
| 5,590,199 A | 12/1996 | Krajewski et al. |
| 5,592,378 A | 1/1997 | Cameron |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Green et al. |
| 5,603,025 A | 2/1997 | Tabb |
| 5,604,490 A | 2/1997 | Blakely et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scharmer |
| 5,642,419 A | 6/1997 | Rosen |
| 5,644,493 A | 7/1997 | Motai |
| 5,653,914 A | 8/1997 | Holmes et al. |
| 5,657,383 A | 8/1997 | Gerber |
| 5,659,165 A | 8/1997 | Jennings |
| 5,661,807 A | 8/1997 | Guski et al. |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,742,683 A * | 4/1998 | Lee et al. ....................... 705/60 |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Pinard et al. |
| 5,761,647 A | 6/1998 | Boushy |
| 5,761,661 A | 6/1998 | Coussenns |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schnier et al. |
| 5,774,122 A | 6/1998 | Kojima |
| 5,778,178 A | 7/1998 | Arunachalam |
| 5,781,909 A | 7/1998 | Logan et al. |
| 5,784,562 A | 7/1998 | Diener |
| 5,787,403 A | 7/1998 | Randle |
| 5,787,404 A | 7/1998 | Fernandez-Holman |
| 5,790,650 A | 8/1998 | Dunn |
| 5,790,785 A | 8/1998 | Klug et al. |
| 5,793,861 A | 8/1998 | Haigh |
| 5,794,178 A | 8/1998 | Caid |
| 5,794,207 A | 8/1998 | Walker |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,665 A | 9/1998 | Teper et al. |
| 5,815,683 A | 9/1998 | Vogler |
| 5,818,936 A | 10/1998 | Mashayekhi |
| 5,819,092 A | 10/1998 | Ferguson |
| 5,819,285 A | 10/1998 | Damico |

| | | | | | | |
|---|---|---|---|---|---|---|
| 5,825,863 A | 10/1998 | Walker | | 5,946,388 A | 8/1999 | Walker et al. |
| 5,825,870 A | 10/1998 | Miloslavsky | | 5,947,747 A | 9/1999 | Walker et al. |
| 5,826,241 A | 10/1998 | Stein | | 5,949,044 A | 9/1999 | Walker et al. |
| 5,826,245 A | 10/1998 | Sandberg-Diment | | 5,949,875 A | 9/1999 | Walker et al. |
| 5,826,250 A | 10/1998 | Trefler | | 5,950,173 A | 9/1999 | Perkowski |
| 5,828,734 A | 10/1998 | Katz | | 5,950,174 A | 9/1999 | Brendzel |
| 5,828,751 A | 10/1998 | Walker et al. | | 5,950,206 A | 9/1999 | Krause |
| 5,828,812 A | 10/1998 | Khan et al. | | 5,952,639 A | 9/1999 | Ohki |
| 5,828,833 A | 10/1998 | Belville et al. | | 5,952,641 A | 9/1999 | Korshun |
| 5,832,211 A | 11/1998 | Blakley, III et al. | | 5,953,710 A | 9/1999 | Fleming |
| 5,832,460 A | 11/1998 | Bednar | | 5,956,695 A | 9/1999 | Carrithers et al. |
| 5,832,476 A | 11/1998 | Tada | | 5,958,007 A | 9/1999 | Lee et al. |
| 5,835,087 A | 11/1998 | Herz | | 5,960,411 A | 9/1999 | Hartman et al. |
| 5,835,580 A | 11/1998 | Fraser | | 5,961,593 A | 10/1999 | Gabber et al. |
| 5,835,603 A | 11/1998 | Coutts | | 5,963,635 A | 10/1999 | Szlam et al. |
| 5,838,903 A | 11/1998 | Blakely, III et al. | | 5,963,925 A | 10/1999 | Kolling et al. |
| 5,838,906 A | 11/1998 | Doyle | | 5,963,952 A | 10/1999 | Smith |
| 5,842,178 A | 11/1998 | Giovannoli | | 5,963,953 A | 10/1999 | Cram et al. |
| 5,842,211 A | 11/1998 | Horadan | | 5,966,695 A | 10/1999 | Melchione et al. |
| 5,844,553 A | 12/1998 | Hao | | 5,966,699 A | 10/1999 | Zandi |
| 5,845,259 A | 12/1998 | West et al. | | 5,967,896 A | 10/1999 | Jorasch et al. |
| 5,845,260 A | 12/1998 | Nakano et al. | | 5,969,318 A | 10/1999 | Mackenthun |
| 5,847,709 A | 12/1998 | Card | | 5,970,143 A | 10/1999 | Schneier et al. |
| 5,848,143 A | 12/1998 | Andrews | | 5,970,470 A | 10/1999 | Walker et al. |
| 5,848,400 A | 12/1998 | Chang | | 5,970,478 A | 10/1999 | Walker et al. |
| 5,848,427 A | 12/1998 | Hyodo | | 5,970,482 A | 10/1999 | Pham |
| 5,852,812 A | 12/1998 | Reeder | | 5,970,483 A | 10/1999 | Evans |
| 5,857,079 A | 1/1999 | Claus et al. | | 5,978,467 A | 11/1999 | Walker et al. |
| 5,862,223 A | 1/1999 | Walker | | 5,983,196 A | 11/1999 | Wendkos |
| 5,862,323 A | 1/1999 | Blakely, III et al. | | 5,987,434 A | 11/1999 | Libman |
| 5,864,830 A | 1/1999 | Armetta et al. | | 5,987,454 A | 11/1999 | Hobbs |
| RE36,116 E | 2/1999 | McCarthy | | 5,987,498 A | 11/1999 | Athing et al. |
| 5,866,889 A | 2/1999 | Weiss et al. | | 5,991,736 A | 11/1999 | Ferguson et al. |
| 5,870,718 A | 2/1999 | Spector | | 5,991,738 A | 11/1999 | Ogram |
| 5,870,724 A | 2/1999 | Lawlor | | 5,991,748 A | 11/1999 | Taskett |
| 5,870,725 A | 2/1999 | Bellinger et al. | | 5,991,751 A | 11/1999 | Rivette et al. |
| 5,871,398 A | 2/1999 | Schneier et al. | | 5,991,791 A | 11/1999 | Rivette |
| 5,873,072 A | 2/1999 | Kight | | 5,991,882 A * | 11/1999 | O'Connell ................ 726/18 |
| 5,873,096 A | 2/1999 | Lim | | 5,995,948 A | 11/1999 | Whitford |
| 5,880,769 A | 3/1999 | Nemirofsky | | 5,995,976 A | 11/1999 | Walker et al. |
| 5,883,810 A | 3/1999 | Franklin et al. | | 5,999,596 A | 12/1999 | Walker et al. |
| 5,884,032 A | 3/1999 | Bateman | | 5,999,907 A | 12/1999 | Donner |
| 5,884,270 A | 3/1999 | Walker et al. | | 6,000,033 A | 12/1999 | Kelly et al. |
| 5,884,272 A | 3/1999 | Walker et al. | | 6,001,016 A | 12/1999 | Walker et al. |
| 5,884,274 A | 3/1999 | Walker et al. | | 6,003,762 A | 12/1999 | Hayashida |
| 5,884,288 A | 3/1999 | Chang | | 6,005,939 A | 12/1999 | Fortenberry et al. |
| 5,889,863 A | 3/1999 | Weber | | 6,006,205 A | 12/1999 | Loeb et al. |
| 5,892,900 A | 4/1999 | Ginter et al. | | 6,006,249 A | 12/1999 | Leong |
| 5,898,780 A | 4/1999 | Liu et al. | | 6,009,415 A | 12/1999 | Shurling et al. |
| 5,899,982 A | 5/1999 | Randle | | 6,009,442 A | 12/1999 | Chen et al. |
| 5,903,881 A | 5/1999 | Schrader | | 6,010,404 A | 1/2000 | Walker et al. |
| 5,909,486 A | 6/1999 | Walker et al. | | 6,012,088 A | 1/2000 | Li et al. |
| 5,910,988 A | 6/1999 | Ballard | | 6,012,983 A | 1/2000 | Walker et al. |
| 5,913,202 A | 6/1999 | Motoyama | | 6,014,439 A | 1/2000 | Walker et al. |
| 5,914,472 A | 6/1999 | Foladare et al. | | 6,014,635 A | 1/2000 | Harris et al. |
| 5,915,244 A | 6/1999 | Jack et al. | | 6,014,636 A | 1/2000 | Reeder |
| 5,918,214 A | 6/1999 | Perkowski | | 6,014,638 A | 1/2000 | Burge et al. |
| 5,918,217 A | 6/1999 | Maggioncalda | | 6,014,641 A | 1/2000 | Loeb et al. |
| 5,918,239 A | 6/1999 | Allen et al. | | 6,014,645 A | 1/2000 | Cunningham |
| 5,920,847 A | 7/1999 | Kolling et al. | | 6,016,476 A | 1/2000 | Maes et al. |
| 5,921,864 A | 7/1999 | Walker et al. | | 6,016,810 A | 1/2000 | Ravenscroft |
| 5,923,763 A | 7/1999 | Walker et al. | | 6,018,714 A | 1/2000 | Risen, Jr. |
| 5,926,796 A | 7/1999 | Walker et al. | | 6,018,718 A | 1/2000 | Walker et al. |
| 5,926,812 A | 7/1999 | Hilsenrath | | 6,024,640 A | 2/2000 | Walker et al. |
| 5,930,764 A | 7/1999 | Melchione | | 6,026,398 A | 2/2000 | Brown et al. |
| 5,933,816 A | 8/1999 | Zeanah | | 6,026,429 A | 2/2000 | Jones et al. |
| 5,933,817 A | 8/1999 | Hucal | | 6,026,491 A * | 2/2000 | Hiles ........................ 726/18 |
| 5,933,823 A | 8/1999 | Cullen | | 6,032,134 A | 2/2000 | Weissman |
| 5,933,827 A | 8/1999 | Cole | | 6,032,147 A | 2/2000 | Williams et al. |
| 5,940,812 A | 8/1999 | Tengel et al. | | 6,038,547 A | 3/2000 | Casto |
| 5,943,656 A | 8/1999 | Crooks | | 6,038,552 A | 3/2000 | Fleischl et al. |
| 5,944,824 A | 8/1999 | He | | 6,042,006 A | 3/2000 | Van Tilburg et al. |
| 5,945,653 A | 8/1999 | Walker et al. | | 6,044,362 A | 3/2000 | Neely |

| Patent No. | Kind | Date | Inventor |
|---|---|---|---|
| 6,045,039 | A | 4/2000 | Stinson et al. |
| 6,049,778 | A | 4/2000 | Walker et al. |
| 6,049,782 | A | 4/2000 | Gottesman et al. |
| 6,049,835 | A | 4/2000 | Gagnon |
| 6,055,637 | A | 4/2000 | Hudson et al. |
| 6,061,665 | A | 5/2000 | Bahreman |
| 6,064,987 | A | 5/2000 | Walker et al. |
| 6,065,120 | A | 5/2000 | Laursen et al. |
| 6,065,675 | A | 5/2000 | Teicher |
| 6,070,147 | A | 5/2000 | Harms et al. |
| 6,070,153 | A | 5/2000 | Simpson |
| 6,070,244 | A | 5/2000 | Orchier et al. |
| 6,073,105 | A | 6/2000 | Sutcliffe et al. |
| 6,073,113 | A | 6/2000 | Guinan |
| 6,075,519 | A | 6/2000 | Okatani et al. |
| 6,076,072 | A | 6/2000 | Libman |
| 6,081,790 | A | 6/2000 | Rosen |
| 6,081,810 | A | 6/2000 | Rosenzweig et al. |
| 6,081,900 | A | 6/2000 | Subramaniam et al. |
| 6,085,168 | A | 7/2000 | Mori et al. |
| 6,088,444 | A | 7/2000 | Walker et al. |
| 6,088,451 | A | 7/2000 | He et al. |
| 6,088,683 | A | 7/2000 | Jalili |
| 6,088,686 | A | 7/2000 | Walker et al. |
| 6,088,700 | A | 7/2000 | Larsen et al. |
| 6,091,817 | A | 7/2000 | Bertina et al. |
| 6,092,192 | A | 7/2000 | Kanevsky et al. |
| 6,092,196 | A | 7/2000 | Reiche |
| 6,095,412 | A | 8/2000 | Bertina et al. |
| 6,098,070 | A | 8/2000 | Maxwell |
| 6,101,486 | A | 8/2000 | Roberts et al. |
| 6,104,716 | A | 8/2000 | Crichton et al. |
| 6,105,012 | A | 8/2000 | Chang et al. |
| 6,105,865 | A | 8/2000 | Hardesty |
| 6,111,858 | A | 8/2000 | Greaves et al. |
| 6,112,181 | A | 8/2000 | Shear et al. |
| 6,115,690 | A | 9/2000 | Wong |
| 6,119,093 | A | 9/2000 | Walker et al. |
| 6,119,099 | A | 9/2000 | Walker et al. |
| 6,128,599 | A | 10/2000 | Walker et al. |
| 6,128,602 | A | 10/2000 | Northington et al. |
| 6,131,810 | A | 10/2000 | Weiss et al. |
| 6,134,549 | A | 10/2000 | Regnier et al. |
| 6,134,592 | A | 10/2000 | Montulli |
| 6,135,349 | A | 10/2000 | Zirkel |
| 6,138,106 | A | 10/2000 | Walker et al. |
| 6,138,118 | A | 10/2000 | Koppstein et al. |
| 6,141,651 | A | 10/2000 | Riley et al. |
| 6,141,666 | A | 10/2000 | Tobin |
| 6,144,946 | A | 11/2000 | Iwamura |
| 6,144,948 | A | 11/2000 | Walker et al. |
| 6,145,086 | A | 11/2000 | Bellemore et al. |
| 6,148,293 | A | 11/2000 | King |
| 6,151,584 | A | 11/2000 | Papierniak et al. |
| 6,154,750 | A | 11/2000 | Roberge et al. |
| 6,154,879 | A | 11/2000 | Pare et al. |
| 6,161,182 | A | 12/2000 | Nadooshan |
| 6,164,533 | A | 12/2000 | Barton |
| 6,170,011 | B1 | 1/2001 | Beck et al. |
| 6,178,511 | B1 | 1/2001 | Cohen et al. |
| 6,182,052 | B1 | 1/2001 | Fulton et al. |
| 6,182,142 | B1 | 1/2001 | Win et al. |
| 6,182,225 | B1 | 1/2001 | Hagiuda et al. |
| 6,185,242 | B1 | 2/2001 | Arthur et al. |
| 6,189,029 | B1 | 2/2001 | Fuerst |
| 6,195,644 | B1 | 2/2001 | Bowie |
| 6,199,077 | B1 | 3/2001 | Inala et al. |
| 6,201,948 | B1 | 3/2001 | Cook et al. |
| 6,202,005 | B1 | 3/2001 | Mahaffey |
| 6,202,054 | B1 | 3/2001 | Lawlor et al. |
| 6,202,151 | B1 | 3/2001 | Musgrave et al. |
| 6,202,158 | B1 | 3/2001 | Urano et al. |
| 6,208,978 | B1 | 3/2001 | Walker et al. |
| 6,208,984 | B1 | 3/2001 | Rosenthal |
| 6,216,115 | B1 | 4/2001 | Barrameda et al. |
| 6,219,639 | B1 | 4/2001 | Bakis et al. |
| 6,219,706 | B1 | 4/2001 | Fan |
| 6,222,914 | B1 | 4/2001 | McMullin |
| 6,226,623 | B1 | 5/2001 | Schein et al. |
| 6,226,679 | B1 | 5/2001 | Gupta |
| 6,226,752 | B1 | 5/2001 | Gupta et al. |
| 6,227,447 | B1 | 5/2001 | Campisano |
| 6,230,148 | B1 | 5/2001 | Pare et al. |
| 6,243,688 | B1 | 6/2001 | Kalina |
| 6,243,816 | B1 | 6/2001 | Fang et al. |
| 6,253,327 | B1 | 6/2001 | Zhang et al. |
| 6,253,328 | B1 | 6/2001 | Smith, Jr. |
| 6,256,664 | B1 | 7/2001 | Donoho et al. |
| 6,260,026 | B1 | 7/2001 | Tomida et al. |
| 6,266,648 | B1 | 7/2001 | Baker, III |
| 6,266,683 | B1 | 7/2001 | Yehuda et al. |
| 6,267,292 | B1 | 7/2001 | Walker et al. |
| 6,269,348 | B1 | 7/2001 | Pare et al. |
| 6,275,944 | B1 | 8/2001 | Kao et al. |
| 6,289,322 | B1 | 9/2001 | Kitchen et al. |
| 6,298,330 | B1 | 10/2001 | Gardenswartz et al. |
| 6,298,356 | B1 | 10/2001 | Jawahar et al. |
| 6,301,567 | B1 | 10/2001 | Leong et al. |
| 6,308,273 | B1 | 10/2001 | Goertzel et al. |
| 6,308,274 | B1 | 10/2001 | Swift |
| 6,311,275 | B1 | 10/2001 | Jin et al. |
| 6,317,834 | B1 | 11/2001 | Gennaro et al. |
| 6,317,838 | B1 | 11/2001 | Baize |
| 6,324,524 | B1 | 11/2001 | Lent et al. |
| 6,327,573 | B1 | 12/2001 | Walker et al. |
| 6,327,578 | B1 | 12/2001 | Linehan |
| 6,332,192 | B1 | 12/2001 | Boroditsky et al. |
| 6,336,104 | B1 | 1/2002 | Walker et al. |
| 6,343,279 | B1 | 1/2002 | Bissonette et al. |
| 6,345,261 | B1 | 2/2002 | Feidelson |
| 6,349,242 | B2 | 2/2002 | Mahaffey |
| 6,349,336 | B1 | 2/2002 | Sit et al. |
| 6,363,381 | B1 | 3/2002 | Lee et al. |
| 6,385,591 | B1 | 5/2002 | Mankoff |
| 6,385,652 | B1 | 5/2002 | Brown et al. |
| 6,401,125 | B1 | 6/2002 | Makarios et al. |
| 6,401,211 | B1 | 6/2002 | Brezak, Jr. et al. |
| 6,408,389 | B2 | 6/2002 | Grawrock et al. |
| 6,411,933 | B1 | 6/2002 | Maes et al. |
| 6,418,457 | B1 | 7/2002 | Schmidt et al. |
| 6,438,594 | B1 | 8/2002 | Bowman-Amuah |
| 6,438,666 | B2 | 8/2002 | Cassagnol et al. |
| 6,449,765 | B1 | 9/2002 | Ballard |
| 6,453,353 | B1 | 9/2002 | Win et al. |
| 6,460,141 | B1 | 10/2002 | Olden |
| 6,487,641 | B1 | 11/2002 | Cusson et al. |
| 6,493,677 | B1 | 12/2002 | von Rosen et al. |
| 6,493,685 | B1 | 12/2002 | Ensel et al. |
| 6,496,855 | B1 | 12/2002 | Hunt et al. |
| 6,496,936 | B1 | 12/2002 | French et al. |
| 6,507,912 | B1 | 1/2003 | Matyas, Jr. et al. |
| 6,510,523 | B1 | 1/2003 | Perlman et al. |
| 6,526,404 | B1 | 2/2003 | Slater et al. |
| 6,532,284 | B2 | 3/2003 | Walker et al. |
| 6,535,855 | B1 | 3/2003 | Cahill et al. |
| 6,535,917 | B1 | 3/2003 | Zamanzadeh et al. |
| 6,535,980 | B1 | 3/2003 | Kumar et al. |
| 6,539,424 | B1 | 3/2003 | Dutta |
| 6,557,039 | B1 | 4/2003 | Leong et al. |
| 6,574,348 | B1 | 6/2003 | Venkatesan et al. |
| 6,580,814 | B1 | 6/2003 | Ittycheriah et al. |
| 6,581,040 | B1 | 6/2003 | Wright et al. |
| 6,584,505 | B1 | 6/2003 | Howard et al. |
| 6,584,508 | B1 | 6/2003 | Epstein et al. |
| 6,589,291 | B1 | 7/2003 | Boag et al. |
| 6,592,044 | B1 | 7/2003 | Wong et al. |

| Patent Number | Date | Inventor(s) |
|---|---|---|
| 6,606,606 B2 * | 8/2003 | Starr .................. 705/36 R |
| 6,609,106 B1 * | 8/2003 | Robertson .................. 705/26 |
| 6,609,113 B1 | 8/2003 | O'Leary et al. |
| 6,609,125 B1 | 8/2003 | Layne et al. |
| 6,609,198 B1 | 8/2003 | Wood et al. |
| 6,609,654 B1 | 8/2003 | Anderson et al. |
| 6,618,579 B1 | 9/2003 | Smith et al. |
| 6,618,806 B1 | 9/2003 | Brown et al. |
| 6,623,415 B2 | 9/2003 | Gates et al. |
| 6,640,302 B1 | 10/2003 | Subramaniam et al. |
| 6,668,322 B1 | 12/2003 | Wood et al. |
| 6,675,261 B2 | 1/2004 | Shandony |
| 6,684,384 B1 | 1/2004 | Bickerton et al. |
| 6,687,222 B1 | 2/2004 | Albert et al. |
| 6,687,245 B2 | 2/2004 | Fangman et al. |
| 6,697,947 B1 | 2/2004 | Matyas, Jr. et al. |
| 6,714,987 B1 | 3/2004 | Amin et al. |
| 6,718,482 B2 | 4/2004 | Sato et al. |
| 6,718,535 B1 | 4/2004 | Underwood |
| 6,725,269 B1 | 4/2004 | Megiddo |
| 6,735,695 B1 | 5/2004 | Gopalakrishnan et al. |
| 6,738,779 B1 | 5/2004 | Shapira |
| 6,751,654 B2 | 6/2004 | Massarani et al. |
| 6,754,833 B1 | 6/2004 | Black et al. |
| 6,755,341 B1 | 6/2004 | Wong et al. |
| 6,763,468 B2 * | 7/2004 | Gupta et al. .................. 726/2 |
| 6,766,370 B2 | 7/2004 | Glommen et al. |
| 6,769,605 B1 | 8/2004 | Magness |
| 6,772,146 B2 | 8/2004 | Khemlani et al. |
| 6,785,810 B1 | 8/2004 | Lirov et al. |
| 6,789,115 B1 | 9/2004 | Singer et al. |
| 6,805,288 B2 | 10/2004 | Routhenstein et al. |
| 6,810,395 B1 | 10/2004 | Bharat |
| 6,819,219 B1 | 11/2004 | Bolle et al. |
| 6,820,202 B1 | 11/2004 | Wheeler et al. |
| 6,826,696 B1 | 11/2004 | Chawla et al. |
| 6,832,202 B1 | 12/2004 | Schuyler et al. |
| 6,847,991 B1 | 1/2005 | Kurapati |
| 6,856,970 B1 | 2/2005 | Campbell et al. |
| 6,892,231 B2 | 5/2005 | Jager |
| 6,907,566 B1 | 6/2005 | McElfresh et al. |
| 6,925,481 B2 | 8/2005 | Singhal et al. |
| 6,934,848 B1 | 8/2005 | King et al. |
| 6,938,158 B2 | 8/2005 | Azuma |
| 6,950,936 B2 | 9/2005 | Subramaniam et al. |
| 6,957,337 B1 | 10/2005 | Chainer et al. |
| 6,965,939 B2 | 11/2005 | Cuomo et al. |
| 6,976,164 B1 | 12/2005 | King et al. |
| 6,980,962 B1 * | 12/2005 | Arganbright et al. .......... 705/26 |
| 6,983,421 B1 | 1/2006 | Lahti et al. |
| 6,992,786 B1 | 1/2006 | Breding et al. |
| 7,010,512 B1 * | 3/2006 | Gillin et al. .................. 705/39 |
| 7,020,696 B1 | 3/2006 | Perry et al. |
| 7,032,110 B1 | 4/2006 | Su et al. |
| 7,058,817 B1 | 6/2006 | Ellmore |
| 7,080,036 B1 | 7/2006 | Drummond et al. |
| 7,089,208 B1 | 8/2006 | Levchin et al. |
| 7,089,503 B1 | 8/2006 | Bloomquist et al. |
| 7,093,020 B1 | 8/2006 | McCarty et al. |
| 7,117,239 B1 | 10/2006 | Hansen |
| 7,137,006 B1 | 11/2006 | Grandcolas et al. |
| 2001/0011255 A1 | 8/2001 | Asay et al. |
| 2001/0012974 A1 | 8/2001 | Mahaffey |
| 2001/0027474 A1 | 10/2001 | Nachman et al. |
| 2001/0032184 A1 | 10/2001 | Tenembaum |
| 2001/0047295 A1 | 11/2001 | Tenembaum |
| 2001/0051917 A1 | 12/2001 | Bissonette et al. |
| 2001/0054003 A1 | 12/2001 | Chien et al. |
| 2002/0007313 A1 | 1/2002 | Mai et al. |
| 2002/0007460 A1 | 1/2002 | Azuma |
| 2002/0010599 A1 | 1/2002 | Levison |
| 2002/0010668 A1 | 1/2002 | Travis et al. |
| 2002/0018585 A1 | 2/2002 | Kim |
| 2002/0019938 A1 | 2/2002 | Aarons |
| 2002/0023108 A1 | 2/2002 | Daswani et al. |
| 2002/0029269 A1 | 3/2002 | McCarty et al. |
| 2002/0032613 A1 | 3/2002 | Buettgenbach et al. |
| 2002/0032650 A1 | 3/2002 | Hauser et al. |
| 2002/0059141 A1 | 5/2002 | Davies et al. |
| 2002/0077978 A1 | 6/2002 | O'Leary et al. |
| 2002/0087447 A1 | 7/2002 | McDonald et al. |
| 2002/0095443 A1 | 7/2002 | Kovack |
| 2002/0099826 A1 | 7/2002 | Summers et al. |
| 2002/0104006 A1 | 8/2002 | Boate et al. |
| 2002/0104017 A1 | 8/2002 | Stefan |
| 2002/0107788 A1 | 8/2002 | Cunningham |
| 2002/0129221 A1 * | 9/2002 | Borgia et al. .................. 712/1 |
| 2002/0152163 A1 | 10/2002 | Bezos et al. |
| 2002/0165949 A1 | 11/2002 | Na |
| 2002/0174010 A1 | 11/2002 | Rice, III |
| 2002/0184507 A1 | 12/2002 | Makower et al. |
| 2002/0188869 A1 | 12/2002 | Patrick |
| 2002/0191548 A1 | 12/2002 | Yionen et al. |
| 2002/0198806 A1 | 12/2002 | Blagg et al. |
| 2003/0001888 A1 | 1/2003 | Power |
| 2003/0018915 A1 | 1/2003 | Stoll |
| 2003/0023880 A1 | 1/2003 | Edward et al. |
| 2003/0026404 A1 * | 2/2003 | Joyce et al. ............ 379/144.01 |
| 2003/0034388 A1 | 2/2003 | Routhenstein et al. |
| 2003/0037131 A1 | 2/2003 | Verma |
| 2003/0037142 A1 | 2/2003 | Munger et al. |
| 2003/0040995 A1 | 2/2003 | Daddario et al. |
| 2003/0046587 A1 | 3/2003 | Bheemarasetti et al. |
| 2003/0046589 A1 | 3/2003 | Gregg |
| 2003/0051026 A1 | 3/2003 | Carter et al. |
| 2003/0055871 A1 | 3/2003 | Roses |
| 2003/0070069 A1 | 4/2003 | Belapurkar et al. |
| 2003/0070084 A1 | 4/2003 | Satomaa et al. |
| 2003/0074580 A1 | 4/2003 | Knouse et al. |
| 2003/0079147 A1 | 4/2003 | Hsieh et al. |
| 2003/0084345 A1 | 5/2003 | Bjornestad et al. |
| 2003/0084647 A1 | 5/2003 | Smith et al. |
| 2003/0088552 A1 | 5/2003 | Bennett et al. |
| 2003/0105981 A1 | 6/2003 | Miller et al. |
| 2003/0110399 A1 | 6/2003 | Rail |
| 2003/0115160 A1 | 6/2003 | Nowlin et al. |
| 2003/0119642 A1 | 6/2003 | Gates et al. |
| 2003/0154403 A1 | 8/2003 | Keinsley et al. |
| 2003/0159072 A1 | 8/2003 | Bellinger et al. |
| 2003/0163700 A1 | 8/2003 | Paatero |
| 2003/0163733 A1 | 8/2003 | Barriga-Caceres et al. |
| 2003/0177067 A1 | 9/2003 | Cowell et al. |
| 2003/0191549 A1 | 10/2003 | Otsuka et al. |
| 2004/0031856 A1 | 2/2004 | Atsmon et al. |
| 2004/0049702 A1 | 3/2004 | Subramaniam et al. |
| 2004/0117409 A1 | 6/2004 | Scahill et al. |
| 2005/0080747 A1 | 4/2005 | Anderson et al. |
| 2005/0082362 A1 | 4/2005 | Anderson et al. |
| 2005/0086160 A1 | 4/2005 | Wong et al. |
| 2005/0086177 A1 | 4/2005 | Anderson et al. |
| 2005/0120180 A1 | 6/2005 | Schombach et al. |
| 2005/0278641 A1 | 12/2005 | Mansour et al. |

FOREIGN PATENT DOCUMENTS

| | | |
|---|---|---|
| DE | 19731293 | 1/1999 |
| EP | 0855659 | 7/1998 |
| EP | 0884877 | 12/1998 |
| EP | 0917119 | 5/1999 |
| EP | 1014318 A2 | 6/2000 |
| EP | 1022664 | 7/2000 |
| EP | 1056043 | 11/2000 |
| EP | 1089516 | 4/2001 |
| JP | H10187467 | 7/1998 |
| JP | 20034329 | 11/2000 |
| JP | 2001134672 | 5/2001 |

| | | |
|---|---|---|
| JP | 2005-242976 | 9/2005 |
| WO | WO 97/43736 | 11/1997 |
| WO | WO 99/40507 A1 | 8/1999 |
| WO | WO 99/52051 | 10/1999 |
| WO | WO 00/68858 | 11/2000 |
| WO | WO 01/18656 A1 | 3/2001 |
| WO | WO 01/35355 | 5/2001 |
| WO | WO 01/43084 | 6/2001 |
| WO | WO 01/88659 | 11/2001 |
| WO | WO 02/17082 A1 | 2/2002 |
| WO | WO 2004/079603 | 9/2004 |

OTHER PUBLICATIONS

Epper, A Player Goes After Big Bucks in Cyberspace, American Banker, vol. 160, No. 86, ISSN: 0002-7561, May 5, 1995, p. 17.
Berry et al., A potent new tool for selling databse, Business Week, Cover Story, Sep. 5, 1994, pp. 56-62.
Applets, java.sun.com, May 21, 1999.
Associates National Bank (DE) Credit Card, The Associates, www.theassociates.com/consumer/credit_cards/main.html , Apr. 6, 1999, 6 pages.
At Your Request, www.wingspanbank.com, Sep. 28, 1999.
Anonymous, Aversion Therapy: Banks Overcoming Fear of the 'Net to Develop Safe Internet-based Payment System w/ Netscape Communicator, Network World, ISSN: 0887-7661, Dec. 12, 1994.
JAVA, Banking on JAVA(TM) Technology, java.sun.com, May 21, 1999.
Bechtel Construction Operations Incorporated Standardizes on Primavera's Expedition Contract Management Software, Business Wire, Jul. 27, 1999.
Anonymous, Corba Overview, arch2.htm at pent21.infosys.tuwien.ac.at, May 25, 1999.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Bank, Cash, Check,Charge—What's Next?, Seattle Times, Mar. 6, 1995.
Marlin, Chasing Document Management, Inform, vol. 13, No. 4, Apr. 199, p. 76-82.
Consortium Created to Manage Common Electronic Purse Specifications, http://www.visa.com/av/news/PRmisc051199.vhtml, printed Feb. 23, 2001.
Construction Financing to Build Your Own Home, ISBN: 0962864307, Jul. 1990.
Civitello Jr., Construction Operations Manual of Policies and Procedures, Third Edition, 2000.
Marchman, Construction Scheduling with Primavera Project Planner, May 25, 1999.
Chester, Cross-platform integration with XML and Soap, IT PTO 09/—Oct. 2001.
Mitchell, Cyberspace: Crafting Software . . . , Business Week, Feb. 27, 1999, pp. 78-86.
Friedman, Dictionary of Business Terms, Barron's Third Edition, Copyright 2000.
Strassel, Dutch Software Concern Experiments with Electronic 'Cash' in Cyberspace, The Wall Street Journal, Apr. 17, 1995.
Post, E-Cash: Can't Live With It, Can't Live Without It, The American Lawyer, Mar. 1, 1995, pp. 116-117.
Thomas, Enterprise Javabeans(TM) Technology: Server Component Model for the Java(TM) platform, java.sun.com, May 2, 1999.
Maize, Fannie Mae on the Web, Doucment ID: 52079, May 8, 1995.
FreeMarkets, printed on Apr. 26, 1999.
The Gale Group, G&D America's Multi-application Smart Card Selected for Combined Payroll and 'Virtual Banking' Program in Mexico, Business Wire, Apr. 24, 1998, p. 241047.
Getting Smart with Java: Sun Micro Says American Express to Use Java for Smart Card, ABCNews.com, printed on Jun. 6, 2000.
Getting Started: Specific GE TPN Post Service Use Guidelines, printed on Apr. 26, 1999.
Harris, Harris InfoSource, printed on Apr. 26, 1999.
Knowles, Improved Internet Security Enabling On-Line Commerce, PCWeek, vol. 12, No. 11, ISSN: 0740-1604, Mar. 20, 1995.
Meredith, Internet bank moves closer to virtual reality, USA Today, May 5, 1995.
Radosevich, Is Work Flow Working?, CNN.com, Apr. 6, 1999 at <http://www.cnn.com/TECH/computing/9904/06/workflow/ent.idg, p. 1 of 5, retrieved from the internet on Nov. 28, 2005.
JAVA, JAVA (TM) Technology in the Real World, java.sun.com, May 21, 1999.
JAVA, JAVA(TM) Remote Method Invocation (RMI) Interface, java.sun.com, 05/32/1999.
JAVA, JAVA(TM) Servlet API, java.sun.com, May 21, 1999.
OMG, Library, www.omg.com, May 25, 1999.
Method of Protecting Data on A Personal Computer, IBM Corporation, TDB 11-85, Order 85A 62426, Nov. 1, 1995, p. 2530.
Clark, Microsoft, Visa to Jointly Develop PC Electronic-Shopping Software, The Wall Street Journal, Nov. 9, 1994, WSJB9.
Sirbu, et al, NetBill: An Internet Commerce System Optimized for Network Delivered Services, printed on Feb. 27, 1995.
Mitchell, Netlink Goes After An Unbanked Niche, Card Technology, ISSN: 1093-1279, Sep. 1999, p. 22.
Barnham, Network Brings Together Producers and Companies, Document ID: 17347.
Houlder, OFT Gives the Individual Top Priority: Report Calls for Deregulation of Business Lending, Document ID: 91716, Jun. 8, 1994.
OMWARE, Inc., Web Pages, Feb. 2000, Retrieved from http://web.archive.org/web20000226033405/www.omware.com/products.htm., Retrieved from the interneet on Nov. 28, 2005.
Anonymous, Overview of CORBA, May 25, 1999.
Harris, Planning Using Primavera Project Planner P3 Version 3.0, User Guide, Copyright 1999 by Eastwood Harry Pty Ltd., 1999.
Johnston, Pondering Passport: Do You Trust Microsoft With Your Data?, www.pcworld.com/resource/printable/article/0.aid,63244,00.asp, Sep. 24, 2001.
Primavera Systems, Inc.—How the World Manages Projects, Expedition Contract Control Software, www.primavera.com, Jun. 23, 2005.
Primaveraa and PurchasePro.com to Create E-Commerce Marketplace for Construction Industry, Primavera Ships P3, version 3.0, www.purchasepro.com/, Sep. 21, 1999, pp. 1-3.
Product Data Integration Technologies, Inc., Step Integratin Authors, printed on Apr. 26, 1999.
Resource Center: Consolidated Edison Selects GE TPN Post, printed Apr. 26, 1999.
Kormann, Risks of the Passport Single Signon Protocol, Computer Networks, Elsevier Science Press, vol. 33, Sep. 20, 2003, pp. 51-58.
SBA: Pro-Net, U.S. Small Business Administration Procurement Marketing and Access Network, Last Modified: Apr. 1, 1999.
Jepsen, Soap Cleans up interoperability problems on the web, IT PTO Jan./Feb. 2001.
Safe Single-Sign-On Protocol with Minimal Password Exposure No Decryption and Technology Adaptivity, IBM Corporation, TDB 03-95, Order 95A, Mar. 2, 1995, pp. 245-248.
Sun Microsystems, Inc., Schema for Representing CORBA Objects in a LDAP directory, May 21, 1999, pp. 1-9.
Jakobbsson et al., Secure and lightweight advertising on the web, Computer Networks, 31 (1999) 1101-1109.
Servlet/Applet/HTML Authentication Process with Single Sign-On, IBM Corporation, IBM Order: 00A6004, Jan. 1, 2000.
Shibata, Seventh International Conference on Parallel and Distributed Systems: Workshops, IEEE Computer Society, Jul. 4-7, 2000.
Siebel, Siebel: Ensuring Customer Success, www.siebel.com, Nov. 17, 1999.
SmartAxis, How it works, http://www.smartaxis.co.uk/seller/howitworks.html, printed on Feb. 23, 2001.
Thomas Publishing Company, SoluSource: For Engineers By Engineers, Thomas Publishing Company, Apr. 26, 1999.
JAVA, Staying in Touch with JNDI, java.sun.com, May 21, 1999.
Summary of The At Your Request Architecture, First USA Bank Confidential and Proprietary, Apr. 2, 1999, pp. 1-8.
Temporary Global Passwords, IBM Corporation, IBM TDB v36, n3, Mar. 1993, Order 93A 60636, Mar. 1, 1993, pp. 451-454.
JAVA, The JDBC(TM) Data Access API, java.sun.com, May 21, 1999.

Carden, Philip, The New Face of Single Sign-on, Network Computing, http://www.networkcomputing.com, printed Dec. 29, 2000, 4 pages.

The check is in the email, Information Today, vol. 12, No. 3, ISSN: 8755-6286, 03/01995.

Thomas Publishing Company, ThomasNet, Apr. 26, 1999.

Ritz, Total Construction Project Management, McGraw-Hill, 1994.

Hewlett-Packard Company, Understanding Product Data Management, Hewlett-Packard Company.

Welcome to MUSE, Apr. 26, 1999.

OMG, Welcome to OMG's CORBA for Beginners Page!, www.omg.co, May 25, 1999.

OMG, What is CORBA?, www.omg.com, May 25, 1999.

Fujimura et al., XML Voucher: Generic Voucher Language, Feb. 2003.

eCharge, eCharge Corporation, www.echarge.com, Dec. 3, 1999.

Fusaro, Roberta, Builders Moving to Web tools Computerworld, Nov. 16, 1998, vol. 32, No. 46, pp. 51, 53.

Seibert, Paul, Facilities Planning & Design for Financial Institutions Bankline Publications, 1996, ISBN: 1-55738-780-X.

Owens, David, Facilities Planning & Relocation RSMeans, 1993, ISBN: 0-87629-281-3.

Larsen, Amy, Internet goes to Work for Builders, InterWeek, Nov. 16, 1998, Issue 741.

Frank, John N. Frank, Beyond Direct Mail, Credit Card Management, vol. 9, Iss. 5, Aug. 1996, 4pgs.

Mary C. Lacity, et al., Mary C. Lacity, et al., The Information Systems Outsourcing Bandwagon, Sloan Management Review, vol. 35, No. 1, Fall 1993, p. 73-86.

Point for Windows Version 3.x Interface Marketing Guide.pdf.

Primavera Systems Delivers Expedition Express, Business Wire, Feb. 23, 1999.

Deckmyn, Dominique, San Francisco manages $45M project via web-based Service, Computerworld, Aug. 9, 1999, vol. 33, No. 32, p. 14.

Mosig, Richard, Software Review: the Construction Project Manager Cost Engineering, Jan. 1996, vol. 38, No. 1, pp. 7-8.

Hernandez, Tomas et al., Software Solutions Building Design & Construction, Nov. 1999, vol. 40, No. 11, pp. 38-40.

Taylor, Telecommunications Demand Analysis in Transition, Proceedings of the 31st Hawaii International Conference on System Sciences, vol. 5, Jan. 6-9, 1998, pp. 409-415.

Cotts, David, The Facility Management Handbook Second Edition AMACM, 1998, ISBN: 0-8144-030-8.

* cited by examiner

SYSTEM AND METHOD FOR SINGLE SIGN ON PROCESS FOR WEBSITES WITH MULTIPLE APPLICATIONS AND SERVICES

CROSS REFERENCE TO RELATED APPLICATIONS

This application is based on and claims priority to U.S. Provisional Patent Application No. 60/142,118, filed on Jul. 2, 1999, and U.S. Utility Patent Application No. 09/608,851, filed on Jun. 30, 2000.

FIELD OF THE INVENTION

The present invention generally relates to systems and methods for providing access to financial accounts and more particularly to systems and methods for sign up, log on and ownership verification procedures for providing access to a plurality of financial accounts over the Internet.

BACKGROUND OF THE INVENTION

As with most industries, the Internet has significantly affected the way in which the financial industry communicates with its customers. Most significantly, major financial institutions have found providing their customers with online access to their accounts both desirable, cost effective, and indeed necessary to remain competitive.

The financial industry faces special hurdles in providing online access to customer's accounts due to the very nature of the accounts being accessed. The account information maintained by financial institutions is probably the most important and private personal information that an institution can hold for a person. Accordingly, controlling access to this information is one of the most significant duties that must be performed by a financial institution.

Most large financial institutions have various divisions that separately handle different types of accounts for their customers. For example one division maintains personal banking accounts (e.g., checking and savings), another division handles mortgages, while yet other divisions are responsible for maintaining credit card and investments respectively. Furthermore, each of the types of accounts is typically governed by a different set of regulations. For example, the rules that govern a checking account are completely different from the rules that govern an investment account. For these reasons as well as others, the divisions within a financial institution have traditionally operated independently, each developing their own systems and methods for operating their particular line of business. Unfortunately, the development of these separate systems has included the separate development of Internet interfaces for communicating with customers. These separate interfaces are confusing to the customer and do not provide a uniform appearance of the financial institution to its customers.

Some financial institutions have attempted to solve this problem by provided links on a single institution web page that lead to the various systems of the divisions of the institution. One significant problem that persists is that a customer must separately sign up, verify ownership, and log onto the separate systems, providing separate passwords and separate verifications of ownership.

Other institutions have solved this problem by requiring ownership of a specific type of account (e.g., a checking account) and manually linking or otherwise associating the privileges of access of all other types of accounts to the required account. This reduces the number of customers with access to their account information and transaction capability to the customer base of the required account.

It is therefore an object of the present invention to solve the problems of the prior art in a system and method that requires only a single sign up, verification and single ID for a website that includes multiple applications and multiple services.

SUMMARY OF THE INVENTION

The system and method of the present invention integrate the Internet front-end log on processes of all of the various systems of the institution. In this manner, the present invention provides a singular way for a customer to identify that they are a customer of the institution, regardless of the application or services that the customer ends up using on the Internet website of the institution. In a preferred embodiment, the single sign on processes are used for customers of a financial institution to view and conduct transactions with respect to their accounts with the institution. These accounts include but are not limited to checking and savings accounts, mortgages, credit card accounts, investment accounts, online trading, auto loans and leases, home equity loans, personal loans, trust accounts, 401 k accounts and insurance accounts.

During the initial sign up for the online access to its accounts, a customer creates their User ID and password online during the same session. There is no need for the institution to mail the User ID or password to the customer. This same sign up process allows the customer to provide verification of ownership to obtain rights to information and services available online for their accounts. Once the customer has logged on (password) and verified their ownership of at least one account, the system displays all of the customer's accounts that are available for access via the Internet website. In addition to signing up existing customers, the present invention permits the creation of non-authenticated IDs for potential customers to use (or for customers to use for non-account access). For example, a non-customer can be provided access to online account opening services, pre-populating application data with their account information saving account application data, viewing status of new account application, and saving calculator and financial planning data.

A significant feature of the present invention is the online verification of ownership by a customer. Based on identifying information entered for one account, the list of all accounts owned by the customer is presented to the customer to choose which accounts they want to access online. Online ownership verification uses only a single account of the customer and the verification criteria associated with the account. A customer may have several accounts with the institution, but may only choose to view one or two online (although the customer may choose to view all the accounts). From the selected accounts, the system of the present invention creates a verification hierarchy with respect to the accounts. The hierarchy places the selected accounts in the order of difficulty of the verification. When determining the verification questions to use for the single account, the present invention selects the account from the hierarchy with the most stringent requirements. The verification of ownership required for the different accounts might be less or more stringent based on the risk of the account and the lack of accessibility of verification data to the general public. For example, the verification required for access to credit card or deposit accounts is the most stringent, requiring a code only available on the back of the card or a PIN known only to the customer. Once the account that is highest in the hierarchy is verified, all other accounts that are equal or lower in the hierarchy are considered verified as well.

Once a customer has signed up and logged on, the present invention displays all customer accounts that the customer has selected for viewing (including account balances) on an account summary page. This account summary page allows the customer to then navigate to the line of business site to see more details or transact using the account. Once signed up for the online process, customers are able to add additional accounts online once they are available online or once a customer acquires a product. This process may not require additional verification of ownership, depending on where the new product falls in the verification hierarchy.

In subsequent logons to the system, the present invention allows customers to re-identify themselves to see a forgotten ID, and to re-verify themselves so they can recreate a password if a password is forgotten. The present: invention allows the customer to create answers to challenge questions that only the user should know the answer to. For example, a challenge question could be, "what model was your first car?". The answers to the challenge questions are stored in the system for future use if the user forgets his password. If the situation occurs that the user does forget his password, he is presented with the challenge questions to which he previously provided the answers. If the user successfully answers the challenge questions, he is allowed access to the system (and is allowed to change his password).

In addition to the challenge questions, the user is also able to create "cue" questions. The cue questions provide the user with a hint as to the user's selected password. For example, if the user selects the name of his dog as his password, the customer can create a cue question such as "What is your dog's name." If the user forgets his password, he is first presented with the cue question to see if the user can recollect the password. If the cue question does not jog the user's memory, he is then presented with the challenge questions that allow the user to re-identify himself to the system.

The present invention is not limited to providing access to personal accounts and is equally applicable to business accounts. Business customers can use the system for online enrollment, fulfillment and ownership verification. This includes customers who want to see both personal and business accounts under one ID and password. The business owner may be a sole proprietor (using a social security number), a business owner or partner (using a tax identification number (TIN)), or a multiple business owner (multiple TINs). Furthermore, the system allows a tiered authority structure where an owner of an account can set up and authorize access to the same or lesser levels of authority to non-owners of the accounts (e.g., spouses or employees). This allows set up and monitoring of sub-IDS for consumers as well as businesses.

Another significant feature of the present invention is its ability to allow the customer to self-service their sign up, logon, and forgotten ID or password processes without having to contact customer service or wait for information to be given or sent to them.

The present invention provides ease of use by the customer since the customer does not need to duplicate work such as inputting his or her social security number, account number, and other personal or account information a number of different times to either sign up for access or to logon to see their accounts. The ability for the customer to use "self-service" sign up and logon failure procedures eliminates or minimizes customer and back office support for fulfillment (e.g., issuing IDs, passwords, and reissued passwords). The single sign on ID and password that allows access to all of the customer's accounts provides speed of fulfillment, ease of use and reduced customer support for issued or forgotten IDs and passwords. The ability for customers to see all of their accounts with one logon eases the customer experience and enhance customer retention, as well as enhancing cross-sell and up-sell efforts.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
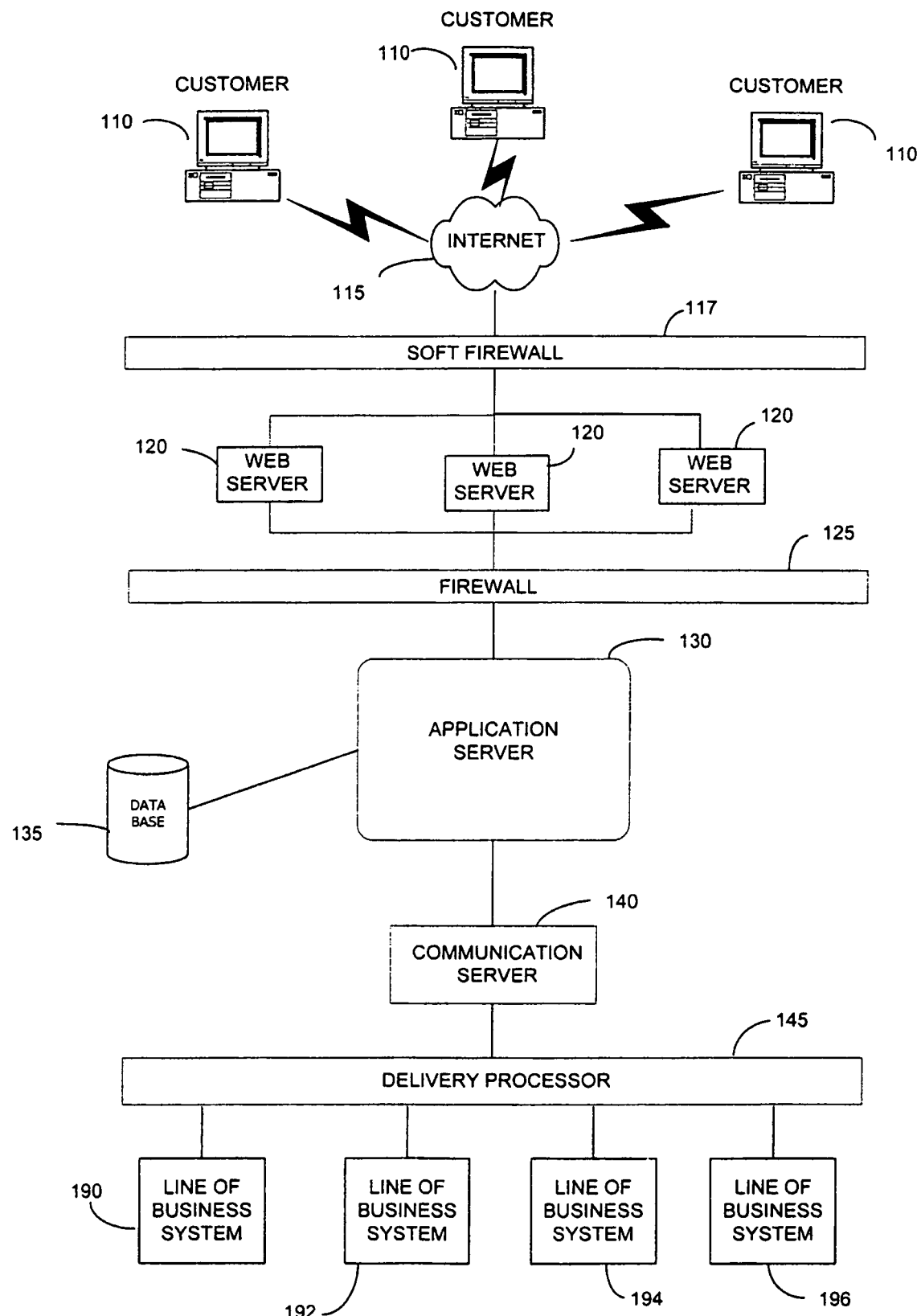
FIG. 1 illustrates the hardware of the system of the present invention.

Referring now to the drawing figures in which like reference numbers refer to like elements, there is shown in FIG. 1 a diagram of the hardware elements of the system of the present invention, designated generally as "100".

System 100 illustrates the system of the present invention that allows customers 110 to use a single sign on procedure to obtain access to a plurality of their accounts residing on the systems 190-196 for different lines of business in the institution. Customers 110 use their workstations 110 to connect to system 100 through a communication network 115. In a preferred embodiment, the network 115 is the public Internet, but can be any other communication connection such as a direct dial up line or a third party value add network. Customer workstations 110 are comprised of any platform capable of running an Internet web browser or similar graphical user interface software. Examples of suitable web browsers include Microsoft's Internet Explorer™ and Netscape's Communicator™. The platform for user workstations 110 can vary depending on the needs of its particular user and includes a desktop, laptop or handheld personal computer, personal digital assistant, web enabled cellular phone, web enabled television, or even a workstation coupled to a mainframe computer.

In the preferred embodiment, customer workstations 110 communicate with system 100 using the Transmission Control Protocol/Internet Protocol (TCP/IP) upon which particular subsets of that protocol can be used to facilitate communications. Examples include the Hypertext Transfer Protocol (HTTP), data carrying Hypertext Mark-Up Language (HTML) web pages, Java and Active-X applets and File Transfer Protocol (FTP). Data connections between customer workstations 110 and data communication network 115 can be any known arrangement for accessing a data communication network, such as dial-up Serial Line Interface Protocol/Point-to-Point Protocol (SLIP/PPP), Integrated Services Digital Network (ISDN), dedicated leased-line service, broadband (cable) access, Digital Subscriber Line (DSL), Asynchronous Transfer Mode (ATM), Frame Relay or other known access techniques. Web servers 120 are coupled to data communication network 115 in a similar fashion. However, it is preferred that the link between the web servers 120 and data communication network 115 be arranged such that access to web servers 120 is always available.

It should be noted that although customer workstations 110 and web servers 120 are shown as each coupled to a single data communication network 115, this arrangement is shown merely for the convenience of aiding explanation of the present invention and is not limited to such. For example, data communication network 115 can be the Internet or other public or private network comprised of multiple communication networks, coupled together by network switches or other communication elements. Between the communication network 115 and the web servers 120 of system 100 is a "soft" firewall 117. Soft firewall 117 is firewall that is erected using only software techniques (as opposed to firewall described below).

Web servers 120 are comprised of one or more central processing units coupled to one or more databases (not shown). In addition, web servers 120 further comprise a network interface (not shown) to couple the processor to data communication network 115, and include provisions for a web site or other technology which can create a network presence from which the provider of web servers 120 can interact with customer workstations 110. Technologies including hardware and software for establishing web sites such as an Internet web site are known.

Web servers 120 can be comprised of any suitable processor arrangement designed to accommodate the expected number of users and transactions for the particular system in which these elements will be implemented (hence the illustration of three web servers 120 in FIG. 1). Known software languages and database technologies can be used to implement the described processes. The databases and programmatic code used by web servers 120 are stored in suitable storage devices within, or which have access to, web servers 120. The nature of the invention is such that one skilled in the art of writing computer executable code (software), would be able to implement the described functions using one or more popular computer programming languages such as "C++", Visual Basic, Java or HTML.

The web servers 120 are each coupled, through a separate firewall 125, to application server 130. The firewall 125 is comprised of both hardware and software components as well known in the art. Firewall 125 is required to protect the confidential information contained in system 100 illustrated below firewall 125 in FIG. 1. As implied by its title, the application server 130 is where the applications employed by the web servers 120 reside. Coupled to the application server 130 is a database 135. Aside from other data, the customer profiles containing the user IDs, passwords and relationship and profile data is stored. Although not shown, database 135 cart include a suitable database management system processor which operates thereon. In addition, although database 135 is shown as a separate entity in FIG. 1, it is contemplated that database 135 can be implemented as part of a storage device within the application server 130, or can even be coupled to application server 130 across a communication link. Database. 135 is preferably a multidimensional database that is analyzed using on-line analytical processing (OLAP) tools.

The application server 130 is coupled to the systems of the various lines of business 190-196 through a communication server 140 and a delivery processor 145. As described below, if a customer wishes to view more detailed information regarding an account, or wishes to conduct some transactions, the user is coupled to the specific line of business system 190-196 that maintains the desired account. The communication server 140 and the delivery processor 145 together they serve as a middleware component for communication between the application server 130 and the line of business systems 190-196.

Figure 2:
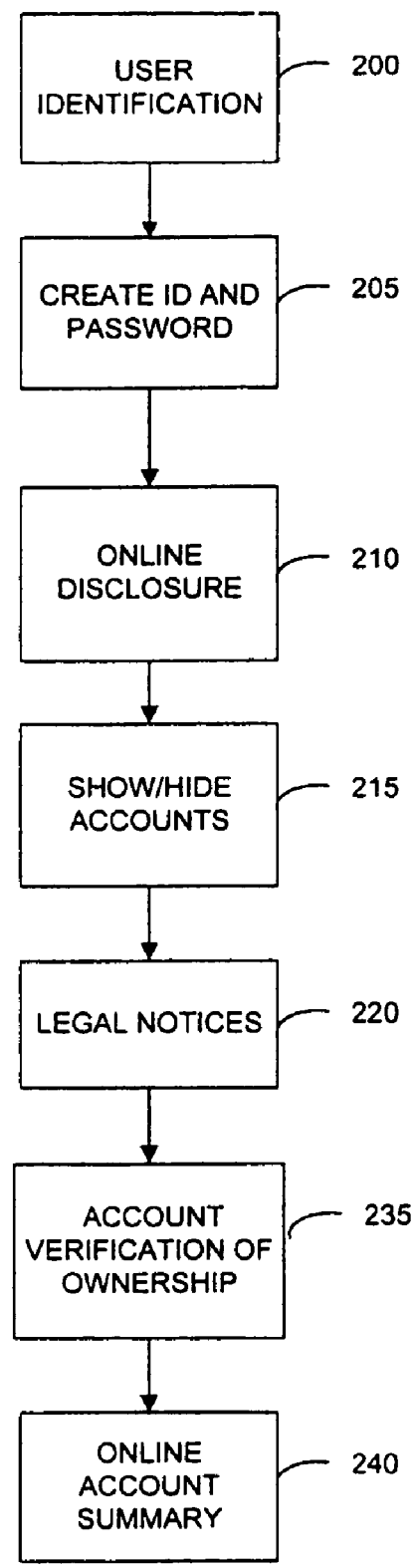
FIG. 2 depicts an overview of the sign up and log on processes of the present invention.

FIG. 2 illustrates an overview of the sign up and log on processes of the present invention. In step 200 a customer is presented with an up-front filter asking them to define themselves as a business, personal, both business and personal, or if they are not a customer. Prior to the customer continuing in the process, a warning is presented to the customer with respect to the dual signature limitation for business customers. Based on the self-section, the customer is presented with an explanation in regard to the linking of personal and business accounts, the single signer requirement, and the necessity of signing up business accounts first.

For business customers, system 100 collects business name, individual name, email, TIN, one account number and type. Then, system 100 identifies that the business customer exists based on a Customer Identification File (CIF) contained in database 135 (see FIG. 1) by matching on TIN and account number.

For personal customers, system 100 collects first and last name, e-mail address, social security number, and account number and type. System 100 then uses the social security number and account number to identify that they exist.

In step 205 the customer selects his own User ID and Password. The User ID is preferably 8-20 characters in length, while the password is preferably 6-10 characters in length with one alphanumeric and one numeric character. The password is also preferably case insensitive. This ID and password is created whether or not the customer was successfully identified in the previous step. If the customer was successfully identified, they will be allowed to continue the sign up process. If system 100 was unable to identify the customer, the customer is requested to call customer service to identify the problem and to continue the sign up process via the call center. Because the customer has already selected their ID and password, the call center representative is able to easily identify the customer using the ID and the customer does not have to wait for fulfillment of an ID and password in the mail and is able to logon to the system after completing the call with the customer service representative.

After creating the User ID and password, the customer is presented with the option to select challenge questions, which as described below, enables them to reset their passwords online, by themselves, in the event the customer forgets the password selected. In step 210, the customer is then presented with an online legal agreement that must be accepted prior to the customer continuing. The online legal agreement contains all of the terms and conditions of the customer's use of system 100. For those customers who were set up via the call center, this legal agreement is presented to them upon logging on for the first time.

In step 215, the customer is shown all of his/her accounts (including business accounts if applicable) that he/she has with the institution. The account information is presented to the customer based on data contained in the customer's CIF profile. After the accounts have been presented to the customer, the customer is given the option to view these accounts using system 100. In addition to the accounts the customer can view, the customer is the customer is shown all services (e.g., tax, payroll, wire transfer, and electronic billing services) in which the customer is able to participate.

In step 235, the customer is presented with a set of verification of ownership questions based on the accounts the customer has selected to access. As previously described, the ownership verification procedure follows a hierarchy where the customer is asked questions based on the "highest level" product he has selected to access. In a preferred embodiment, for personal customers, credit card accounts are the highest level, followed by deposit, loans, investments, and mortgages. All products are represented and have an assigned level within the verification hierarchy. If the customer passes verification, he/she has completed the sign up process, is presented with a screen confirming which accounts they can access and can proceed to logon to access their accounts. If the customer fails verification—for example, due to missing information on the host systems—the customer can "drop down" to the next account type on the hierarchy or contact Customer Service for assistance. Upon successfully passing the lower level verification questions, the customer will have rights to access those accounts and any accounts lower in the hierarchy, but will not have the rights to access the accounts that were represented by the failed, higher level of verification questions.

In the initial sign-up process and during subsequent log ons, system 100 checks to ensure the customer has a browser that provides adequate security measures (e.g., encryption). This check also validated that the customer can receive cookies and has javascript enabled on their browser settings. This security is required because of the sensitive financial nature of the information being provided to the customer. In a preferred embodiment, the customer's browser supports 128-bit encryption. When the user clicks on 'Sign Up' or 'Log On' from the main welcoming screen of system 100, or when the user attempts to access a protected resource, the browser check is completed. If the user's browser is detected with less-than-128-bit encryption the user is given the option to download the latest browser/patch or given instructions on how to correct his situation. In addition, a self-check function is provided for customers when learning about system requirements for signing up.

Figure 3:
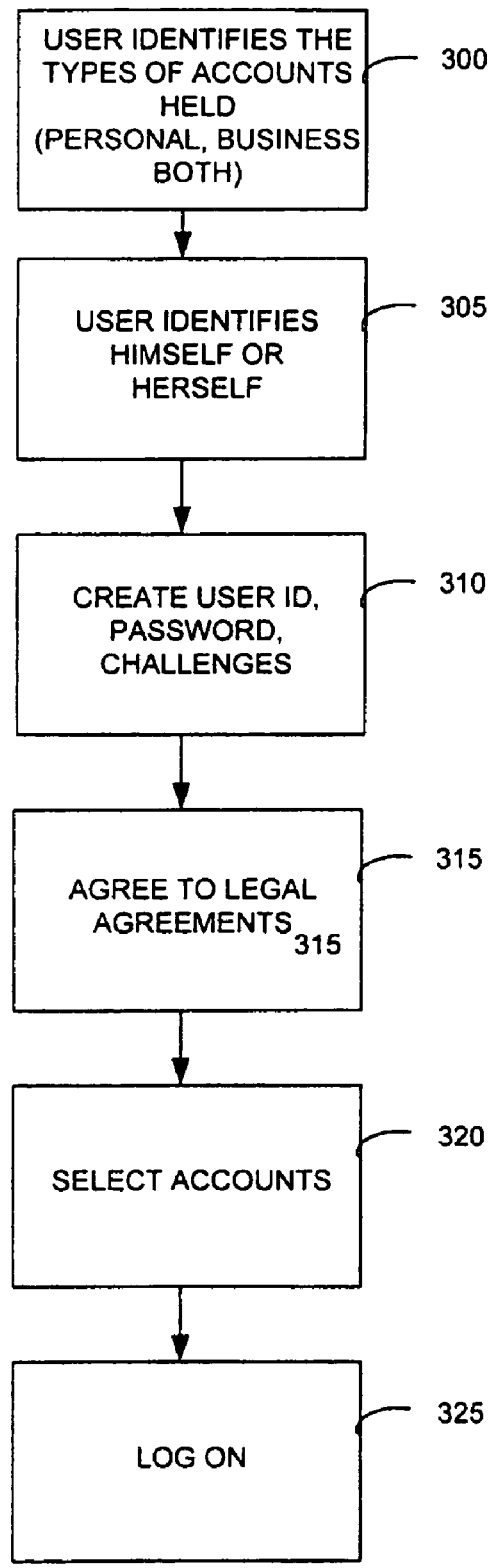
FIG. 3 shows a detailed flow of the sign up process.

FIG. 3 illustrates the detail of the sign up process. The sign up procedures allow a new user to create an online User ID and Password. In addition, if this user is also a customer of the financial institution, he/she can register for access to his accounts. As previously described, the present invention operates, in a Graphical User Interface (GUI) environment, in which the users are presented with a series of screens. The screens allow the system 100 to both elicit information from the user (e.g., selections) and present information to the user (e.g., account summaries). In the sign-up process, the first screen presented to the user is filter screen that asks the customer which accounts he would like to access (see step 300). In a preferred embodiment, the choices on this filter screen include: Personal Only, Small Business Only, Both Personal and Small Business using one User ID, Both Personal and Small Business using two User ID's, and "I do not have accounts with the institution". Depending on the selection, the user is presented with a brief description of the Sign Up process and features and benefits information. The filter pages are used to determine whether the user is presented with the Personal, Small Business, or Prospect Identification questions.

In step 305, the user identifies himself or herself to system 100. Depending on the entry point, the identification process differs slightly. A user coming for account access is asked if they are trying to access their personal, small business, or both accounts. If they select personal, they will see a personal identification screen. If they pick either Small Business or Both, they will start at the Small Business identification screen.

Each of the identification screens prompt the user for information sufficient to retrieve the customer's information from the CIF. This information includes the Social Security Number (SSN) for access to personal accounts, the Taxpayer Identification Number (TIN) for access to business accounts, the customer's account number and account type, the user's first and last name and email address. The email address portion of the input screen for identification also has a check box to allow users to opt-in for marketing email messages.

Additionally, customers are requested to choose a country from a drop-down with a list of countries. The entry for the United States is the default and other countries are preferably listed alphabetically. If the user chooses the United States, he is also prompted to enter a zip code. This information is collected to understand which regulatory requirements under which customers may be covered if they choose to apply for a product line.

The account type field is populated from a selection by the user from a drop-down list box of account types. The presentation of this dropdown list varies depending on the type of user. Users coming through an access point other than signing up for account access are presented with a complete list of all account types that are on CIF. In a preferred embodiment, the following are the types of accounts accessible from system 100: Credit Card; Mortgage; Checking; Savings; Overdraft Line of Credit; Credit-on-Demand; Certificates of Deposit (CDs); Money Market Account (MMA); IRA—CD; IRA—Savings; IRA—MMA; Investments; Personal Loans; Auto Loans; Home Equity loans and Line of Credit; and Insurance.

The user iterates through the identification screen until all mandatory fields are entered in the proper format. Next, the social security or TIN and the account number are used to query the CIF for a match. If a CIF# record is found for this user, system 100 checks to see if a user ID associated with this CIF# already exists in the system 100. If such a user ID is already associated with the CIF for the customer, system 100 displays the ID to the user and explains that multiple ID's are not allowed. In this case, the user is given the option to Log On with this ID (see below) and explain to him that if he was trying to "add" or "show" an account, he should Log On and use the Show/Hide Accounts link to accomplish this. If the customer never finished the Sign Up process previously begun, the customer is provided a link to Log On and the customer is presented with the screen applicable to their next step in the process. System 100 also asks the user if he has forgotten his password and provides a link that takes the user to Log On/Re-authenticate flow (see below).

The process varies slightly for prospects (users with no accounts with the financial institution). For a prospect, the user is prompted for First and Last Name, Email address (required), Company Name, and an indicator of their interest (personal products, small business products, or both). This user is automatically passed to the Create ID/Password, step 310, since there is no need to perform a CIF match.

In step 310, the user is prompted to Create a user ID, a password and challenge questions. Regardless of whether the user is identified on the CIF, the user is allowed to create an ID and password that are added to the database of system 100. Prospects (users without current accounts) are allowed to establish a user ID and password in order to facilitate Sign Up at a later time or to access non-account features, such as saving data to a calculator or application or personalizing a financial utility page. The user is created in the system by adding the ID, password and email address to the database. If the user has been identified as a customer with current accounts, the customer's CIF number is also stored in the database with the ID and password.

At this point in the sign up process, the user is also prompted to select and answer challenge questions. These challenge questions replace the prior art method of re-verifying using account information. The user selects one question from each of three drop down lists and completes the answers. Users that have passed the CIF match (i.e. customers) have the option to opt-out of challenges. If they choose to do so, they will not be able to re-verify online and create a new password. They would have go through the customer service center of the institution and a new password is mailed to them. As previously described, the challenge questions are personal in nature, of a type that only the user would be able to answer them (e.g., what was your first grade teacher's name).

After the user completes the user ID, password and challenge question fields, the customer is presented with a verification screen where she has the opportunity to go back and change the user ID, password, and/or challenges if they are not correct. If the user is not found on the CIF and the user attempted a CIF match, he will be assigned a role indicating he has not been identified as a customer of the institution (denoted as an UNAUTH user). The treatment of these users is the same as prospects. The Sign Up process ends at this point for users not found on the CIF. They are presented with a dynamic customer support screen.

In step 315, the user is presented with the legal agreement governing the user's access to system 100. All users creating a user ID and password have to accept the legal agreement. This is equally true for prospects and customers that have both passed or failed the CIF match. Since these users will have other functionality at the site, they all need to accept the legal agreement. The user is presented with the legal agreement and has the option to select "I Agree" or "I Disagree" or "Print". If the user rejects the disclosure, she is notified that she cannot continued with the sign up process and is presented with the option to view it again. If the user accepts the disclosure, the sign up process continues.

After the user accepts the legal agreement, there is a decision point before proceeding to the next step. If the customer was coming from a process other than signing up for account access, the user will be prompted to Log On. After successfully logging on, the user is returned to the process that brought him to Sign Up. If the user is signing up for account access, the user will continue with show/hide functionality.

As part of the sign up process, the user is prompted in step 320 to select accounts the she would like to access using system 100. The user is presented a list of her accounts/relationships with the institution and is prompted to select "products" she wishes to web-enable. The list of relationships is presented to the user in the form of a checkbox list with product names, and partial account numbers. After selecting accounts to activate, the user is presented any associated legal agreements and further authentication and verification of ownership questions, based on the products/services she has chosen and the placement of the products in the verification hierarchy. The authentication process is described in more detail below.

In addition to providing access to accounts, the customer is also able to access services that are associated with the selected accounts. For example, a wire transfer capability is presented if the customer has selected a DDA (checking) account. The reason that these services are presented separately is that they may 1) be available only to certain products and 2) may have fees associated with their selection or 3) may have a special legal agreement or registration process associated with it. As a result, the customer cannot be given automatic rights to the service.

The final step in the sign up process is the log on step 325. After the user completes the activate accounts process of step 320, the user receives a welcome and confirmation screen and is prompted to log on to access their accounts. At the same time, a request to generate and mail an Enrollment Verification Letter (EVL) to the user's home address on record is sent to the back office of the institution. This letter provides an out-of-band notification that the user has been enabled to access and transact on their accounts online and is used to discover fraud attempts if someone other than the customer has obtained knowledge of the identification and verification of ownership data. The user receives this EVL once, i.e. the very first time he signs up (not during subsequent enabling of accounts). In addition to the letter, the customer is sent a real-time email (if an email address was provided in step 305), which will confirm his enrollment.

Figure 4:
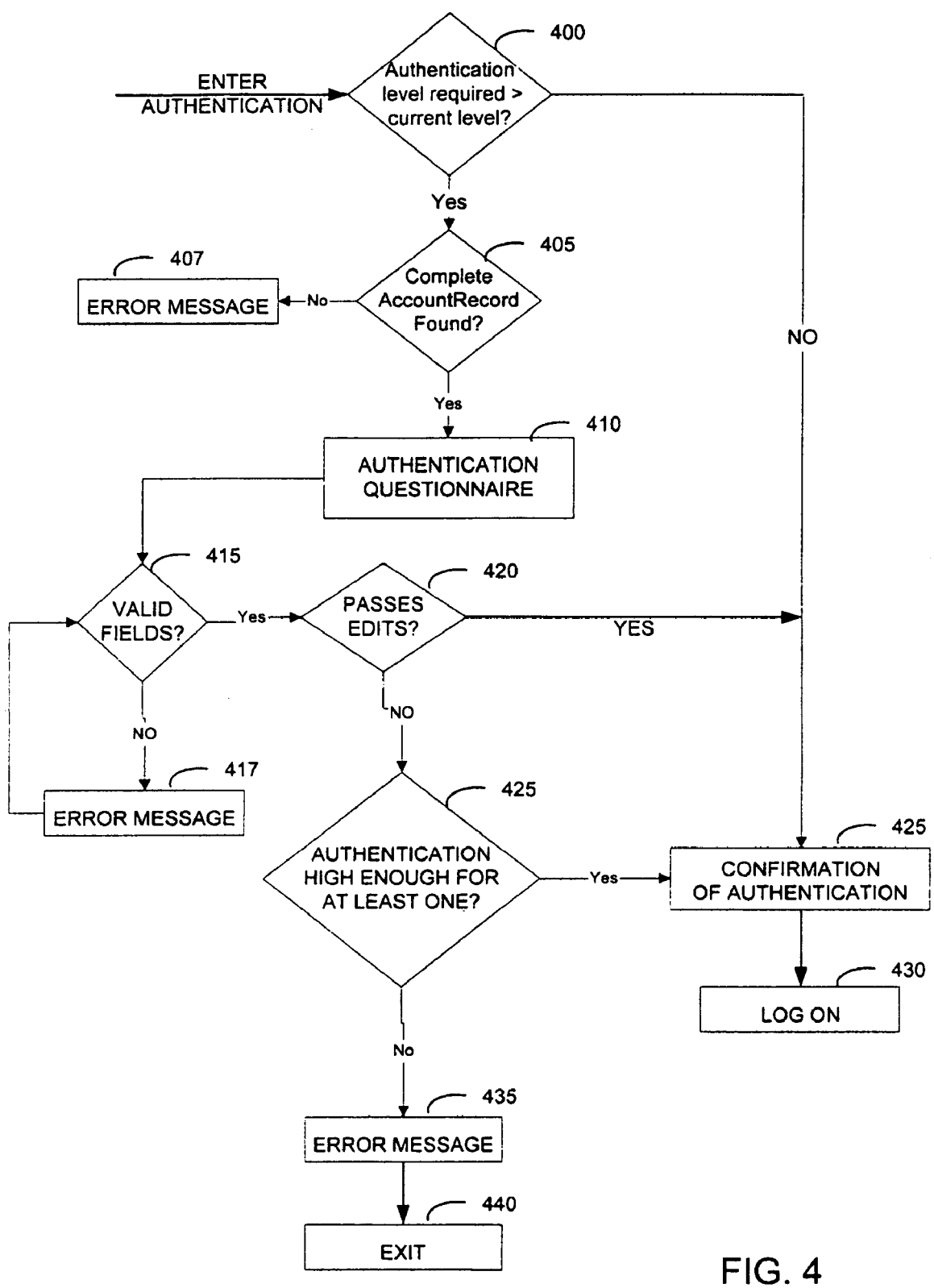
FIG. 4 illustrates the authentication process.

FIG. 4 depicts in more detail the ownership verification process. In order to enable access to view or transact against accounts, a customer must undergo an ownership verification as is illustrated in FIG. 4. This ownership verification process is used by both new and registered users to verify ownership of an account whenever a customer attempts to "show" accounts that require a higher level of verification than what she currently has.

As previously described, verification for online access is based on a hierarchy of products within the institution. Customers who verify ownership (correctly answer questions for a particular product) are verified authenticated for each of the products below it in the hierarchy. For example, individuals who enable their checking and mortgage accounts for online access are verified with questions based on their Checking account, since checking is at a higher level in the preferred product verification hierarchy defined by the institution. If the same customer later decides to enable their credit card account online, they must answer additional questions, since the credit card account is higher in the hierarchy than the customer's current level of verification. By the same token, if the customer later chooses to enable his auto loan account, he is not required to answer any further verification questions since his current level of verification supercedes that required by auto loans.

Verification according to the present invention is different from the prior art authentication for several reasons. First, some of the prior art verification questions are not applicable to the Internet channel or to the "self-service" methods of the present invention. For example, a question related to a "a recent transaction" cannot be prompted and verified by a system such as system 100 in real time. The verification questions of the present invention relate to access to accounts via the Internet Channel, and are not related to a global name or address change.

Prior to entering the verification process of the present invention, the user must have accepted the acknowledgment(s) and or agreement(s) for all product types for which the system is attempting to verify the customer (see step 315). Once ownership is verified, the verification level and date are updated on the user's profile in the database of the system 100. If the user was directed to the verification screen because she was requesting access to a new account, the user is returned to the select accounts screen (see step 320 in FIG. 3).

Of the products the customer has chosen to activate online during the select account process (step 320 of FIG. 3), an account of the "highest" product type on the hierarchy is chosen to verify against. If multiple accounts of this product type have been selected, the system performs the following logic to determine which account to use for product-level verification. If the product type for verification is the same type that the user identified himself with during sign up/identification, the account number chosen during identification is used. If the product type was not used for identification, then the first account returned on the list is used.

In step 400 it is determined if the authentication level for the current product/account selected is greater than the current level of verification performed by the user. If it is not, the process proceeds to step 425 in which the user is confirmed for the present level of verification. In a preferred embodiment of the present invention the hierarchy implemented for personal customers (as opposed to business customers) is: Credit Card; Checking/MMA (excluding IRA MMA); Savings/IRA MMA/IRA Savings; CD/IRA CD; Overdraft Line of Credit; Investments; and Mortgage. The customer's SSN is not used for verification of a product since the user has already entered it during the Sign Up/Identification process. If a higher level of verification is required, the system, in step 405 checks to see if there is a complete record for the account in the database of system 100. If there is not a complete record, an error message is generated in step 407.

In step 410, the user is presented with a list of fields and asked to enter verification of ownership information based or the specific account selected from the hierarchy. All verification fields presented to the user are required to be filled out. The user iterates through the screen of verification questions until all fields are entered. (Note that this data is validated only for completion at this point and is not yet compared to the database). System 100 notifies the user as to which required fields are missing, if any. System 100 refers to the product section for the verification questions to be asked for each product. In step 415, system 100 verifies that all of the fields have valid data. If there is invalid data (e.g., a missing digit in an account number) an error message is generated in step 417 and the user has the chance to fix the data.

Once all mandatory fields are entered, the user has three attempts to modify the verification information before the verification of ownership process is halted (step 420). For security reasons, when information is incorrect, the specific field will not be highlighted. A generic message is used, such as "Verification failed. Please try again." Once the user has successfully verified, the verification is confirmed in step 425 and the user is able to then log on (step 430). The user's profile is updated with the "new" verification level and date and a log transaction is created.

If the user is not able to present accurate information for authentication after three tries in step 420, it is determined whether the user has provided enough information for authentication for at least one product/account. If she has, the confirmation of step 425 is followed. If there is insufficient authentication for any product an error message is displayed in step 435 and the authentication processes is exited in step 440.

The following are some examples of the verification questions required for access to specific accounts. For credit card products, it is required that the user enter the trailing 4 digits for all of the accounts they are selecting to "show". If the user incorrectly enters the trailing digits for the account being used for verification, then, after three attempts, the user fails verification altogether. However, if the user incorrectly enter the trailing 4 digits for an account not being used for verification, then the user just does not have online access to that account. In addition to the account number, the user will be prompted to answer questions related to the following: Mother's Maiden Name; the CVV/C2 number printed on the reverse side of the physical credit card; Date of Birth; and Home Phone Number.

If the user's highest account in the product hierarchy is the checking equivalent product account or if the user has a credit card with incomplete information and he has a checking account, the following information is required for verification. Checking equivalent accounts include accounts such as a Money Market Account (MMA). The verification information required for access to a checking account includes: Account number; Mother's Maiden Name; Transaction Amount (e.g., exact amount of last withdrawal); Posting Date (of last transaction); Last Deposit Amount; and Last Deposit Date.

If the user's highest account in the product hierarchy is the checking equivalent product account or if the user has a credit card with incomplete information, he does not have a checking account and he has a savings account, the following information is required for verification. Savings equivalent accounts include a complete savings family of Savings, IRA MMA, and IRA Savings accounts. The verification information required for access to a savings account includes: Account number; Mother's Maiden Name; Last Deposit Amount; Last Deposit Date: Transaction Amount (e.g., Withdrawal); and Posting Date.

If the user's highest account in the product hierarchy is the Certificate of Deposit (CD) equivalent product account or if the user has a credit card with incomplete information, he does not have a checking or savings account and he has a CD account; the following information is required for verification. CD equivalent accounts refers to a complete CD family of CDs and IRA CDs. The verification information required for access to a CD account includes: Account number; Mother's Maiden Name; Date Opened; Original Principal Amount; Maturity Date; and Posted Interest.

If the user's highest account in the product hierarchy is an investment account, auto loan, personal installment loan, home equity loan, or mortgage, and the customer identified themselves in step 305 with that account, the customer is not presented with verification questions in the preferred embodiment since the business requirement is that the customer verify themselves using only a social security number and an account number. If they did not identify themselves in step 305 with the highest account in the verification hierarchy, the customer is requested to complete the account number of the account which is at the highest level.

The verification of ownership processes for online access for Small Business customers is dependent on whether or not the customer has a deposit product in their profile. As with personal authentication, if a business customer verifies or correctly answers questions for a particular product, they are automatically verified for each of the products below it in the hierarchy. Verification requirements for Small Business customers differs from that for Personal customers. Products available for online access are Checking, MMA, Savings, CD, Credit Card, Revolving credit products and Investments. As a rule, a business customer must either verify ownership against a deposit account or an investment account. In a preferred embodiment, small business customers will not be able to verify against any other accounts. In the preferred embodiment, the verification hierarchy for small businesses is as follows: Checking/MMA; Savings; CD; and Investments.

As a result of the aforementioned rules, a business customer in the preferred embodiment will only be able to verify ownership against their Deposit or investment accounts for online access. Once verified, the customer can access all the products below the deposit account in the hierarchy.

Although described briefly before, the following generally describes the log on process. When a user logs on, several scenarios exist based on varying ID and password combinations inputted by the user such as valid ID/invalid password, invalid ID/invalid password, etc. Although each of these scenarios is a bit different, it has been learned that if the scenarios are treated differently, the system 100 will reveal information regarding a "hit" on a valid ID, as well as information regarding the security and authentication logic and User ID status within the system. To ensure that system 100 does not leak any such information, all scenarios with regard to invalid ID/PW combinations are treated identically. The customer has the ability to click on a "Having Trouble?" link and be presented with Help options (that is, contact customer support or re-authenticate online options).

If the user types in a valid ID/valid Password combination, the system 100 logs the user in successfully. If the user types in a valid ID but has used the same ID for three consecutive log on attempts (not necessarily in the same session) and this is a valid ID, system 100 locks the user out. A User ID is locked after three (3) unsuccessful log on attempts with invalid passwords over an infinite number of days without a successful log on. A counter within system 100 tracks the number of unsuccessful log ons. This counter is reset upon successful log on. Once a User ID is locked, it will remain locked indefinitely until the user re-authenticates online or calls Customer Support. (Customer Support has a function to unlock IDs) Even though a User ID is "locked", the user will not see any change to the logon screen. The same logon screen will continue to appear regardless of the number of failures. The user is not told that the User ID has been locked. There is a link titled "Having Trouble?", which when clicked, instructs the user to contact Customer Support or Re-authenticate online.

If the user types in an invalid ID and an invalid password, system 100 provides a global parameter to detect this situation by sending an alert message to a pre-defined list of administrators when there have been, for example, 1000 failed log on attempts in 5 minutes. Due to the security risk of information leakage if a different screen is presented, this user will not see any change to the log on screen, but will see the same "Having Trouble?" link.

As seen above, in the simplest case, the user logs on successfully and goes to the Account Summary page to view their accounts. However, there are several other situations that must be accounted for, such as a user exceeding the maximum number of consecutive log on attempts (using the same ID), the user has forgotten his password, or the user has received a pre-expired password in the mail and is attempting to log on.

If the user forgets his password or his ID, he can re-authenticate himself to the system using the procedures described above with respect to challenge questions. An additional feature of the present invention is the use of "cue" questions. As part of the initial sign on process, or at a later time, the user is able to cue questions that provide the user with a hint as to the user's selected password. For example, if the user selects the name of his dog as his password, the customer can create a cue question such as "What is your dog's name." If the user forgets his password, he is first presented with the cue question to see if the user can recollect the password. If the cue question does not jog the user's memory, he is then presented with the above described challenge questions that allow the user to re-identify himself to the system.

After a user has successfully logged on, the user's profile is scanned for any accounts for which the user has not accepted associated legal agreements. In addition, if a legal agreement has been updated and Legal determines that all users must be re-disclosed, such disclosures are presented to the user again for acceptance. Access is not granted to a product type until all required legal agreements have been accepted.

The log on function also takes into account the fact that a user will not automatically be going to the Account Summary page. Prospects (non-customers) sign up to system 100 to utilize a function other than seeing account information. When a Prospect or a customer coming from another process than account access completes the sign up process, she is directed to Log On. Upon a successful Log On, this user is then returned to the proper process. For example, if a user is coming from another process, the user is returned to this process instead of being taken to the Account Summary page.

For example, a user might be following a URL to see the status of an online application for a mortgage account. This page is protected, thus requiring the user to Log On before being presented with the page that contains the customer's personal information. Upon a successful logon, the user should be brought directly to the page she requested.

The log on process also presents the opportunity to collect challenge questions from current customers if they have not already done so. Upon a successful logon, the user is prompted to select and answer challenge questions. As previously described, these questions replace the verification of ownership using account information. The user selects one question from each of three drop down lists and completes the answers. Since these are all customers of the institution, they will have the option to opt-out of challenges. If they choose to do so, they will not be able to re-authenticate online and create a new password. They would have go through the help center and a new password is mailed to them.

One of the significant features of the present invention is the ability for a customer to re-authenticate himself or herself to system 100, such as in the case of a forgotten password or user ID. Typically a user is directed to the re-authentication page from the log on screen, when the user has unsuccessfully tried to log on. Successful re-authentication allows the user to subsequently change his password. The "new" password is not validated against the "old" password to verify that they are different—thus, a user who has hit the maximum failed log on attempts can "reset" his password to the same password. At this point, the user is taken back to the Log On page.

For re-authentication, users will be presented with two of the three "challenge" questions that were originally created during sign up or log on as previously described. The user answers to these questions during re-authentication must match the answers they previously provided. In a preferred embodiment, if the user unsuccessfully attempted to re-authenticate online 9 number of times in the last 30 days, the user will not have the ability to change their password online. These users are stopped before challenge questions are presented and given an error message instructing them to call customer service. For example, the user can only try and re-authenticate during 3 sessions in 30 days.

If a user is eligible to re-authenticate online using challenge questions, system 100 randomly selects two of the three challenge questions and presents them to the user. The user has three opportunities to answer these questions. If they do not pass after three attempts, the user is directed to an error screen. If the user successfully answers these questions, they are then able to change their password online.

As previously described in relation for FIG. 1, the purpose of the sign-up, log on and verification procedures is to allow customers to view all of their accounts with the institution though a single interface with a single sign on process. The account summary page of the present invention summarizes all of the accounts in a balance sheet format that the customer has selected to "show" and for which the customer has been verified. Each account that the user has selected to "show" for online access is displayed on this screen under either the "Deposit", "Credit Card and Revolving Credit", or "Mortgage and Loans" main heading. When the user clicks on a specific account to view details, he enters the system for the specific line of business (LOB) (see 190-196 in FIG. 1).

On the account summary screen, the user is presented with a list of their enabled accounts, from which they can make a selection to see more details. They make their selection by clicking on the relevant hyperlinks, which brings the user into the appropriate LOB site supporting the selected product/account. For example, the supporting LOB site could be online banking, mortgage servicing, investment or trading or credit card servicing. This screen also contains summary (balance) information for each of the accounts presented to the customer. This information will vary depending on the type of account.

When the user comes to the account summary screen, system 100 uses the customer profile to determine which accounts to display on the summary screen. The user's accounts are validated with the respective LOB system once per session. The validation consists of verifying that the account still exists and that this status is still valid. In the case of an invalid status or account that no longer exists, a pop-up window instructs the user that account has been removed from his online portfolio and provide the phone number for customer service. The account title and account number (with certain digits masked) are displayed for all enabled accounts. The account summary (balance) information for each of the accounts is displayed to the customer. Like the account status information, this information is refreshed once per session.

Other options available to the customer from the account summary screen include the ability to maintain their user profile. This includes maintenance of the e-mail address entered in the sign up process or in a previous maintenance session, changing a password (once the old password is entered), changing challenge questions, adding personal loans to their business online profile or selecting or deleting accounts from their online profile. The selection of accounts is available because the customer may have previously failed the verification of ownership of the account, the account has been originated since the customer signed up for online access, or the account now has web-enabled access.

When adding additional accounts to their online profile, the level of hierarchy previously verified is compared against the highest level of the accounts selected for addition. If the requested accounts are lower or equal to the verification level, the accounts are automatically enabled in the customer's online profile. If the requested accounts are higher than the previously passed hierarchy level, the verification questions related to the highest of the requested accounts are presented to the customer for completion. In this case, the requested accounts are not added to the customer's online profile until they successfully pass the verification of ownership questions.

Although the present invention has been described in relation to particular embodiments thereof, many other variations and other uses will be apparent to those skilled in the art. It is preferred, therefore, that the present invention be limited not by the specific disclosure herein, but only by the following claims.

What is claimed is:

1. A method for user-serviceable re-authentication for access to one or more financial accounts using a single sign on procedure, the method comprising:
    establishing a user identification;
    establishing a user password associated with the user identification;
    presenting a user with pre-determined challenge questions;
    prompting the user to create one or more original answers to one or more of the pre-determined challenge questions;
    associating the one or more original answers with the respective one or more pre-determined challenge questions;
    providing access to the one or more financial accounts by:
        prompting the user to provide the user identification,
        receiving the user identification from the user,
        prompting the user to provide the user password,
        providing a first mode of access to the one or more financial accounts in the event the user password from the user is received; and
        providing a second mode of access to the one or more financial accounts in the event the user password is not received, wherein the second mode provides access to the one or more financial accounts by:
            selecting and presenting to the user at least one of the pre-determined challenge questions having an original answer associated therewith, and
            receiving the original answer associated with each of the at least one selected pre-determined challenge questions from the user;
    prompting the user to provide ownership verification information; and
    receiving the ownership verification information from the user;
    wherein the one or more financial accounts comprise a plurality of financial accounts, and the method further comprises:
    ranking the relative ownership verification information requirements for each of the plurality of financial accounts based on the stringency of the ownership verification requirements for each financial account;
    providing the user with access to a first financial account having the most stringent ownership verification information requirements that are satisfied by the ownership verification information; and
    providing the user with access to the all of the plurality of financial accounts having less stringent ownership verification information requirements than the first financial account.

2. The method of claim 1, wherein:
    prompting the user to create one or more original answers to one or more of the pre-determined challenge questions comprises prompting the user to create respective original answers to at least three of the pre-determined challenge questions; and
    randomly selecting and presenting to the user at least one of the pre-determined challenge questions having an original answer associated therewith comprises randomly selecting and presenting to the user at least two of the pre-determined challenge questions having an original answer associated therewith.

3. The method of claim 1, further comprising:
    prompting the user to provide one or more user-defined cue questions associated with the user password; and
    receiving the one or more user-defined cue questions from the user.

4. The method of claim 3, further comprising providing a third mode of access to the one or more financial accounts by:
    prompting the user to provide the user identification;
    receiving the user identification from the user;
    prompting the user to provide the user password;
    receiving an incorrect user password from the user;
    presenting to the user at least one of the one or more user-defined cue questions in response to receiving an incorrect user password from the user; and
    receiving the user password from the user.

5. The method of claim 1, further comprising:
    prompting the user to provide ownership verification information; and
    receiving the ownership verification information from the user.

6. The method of claim 5, wherein the one or more financial accounts comprise a plurality of financial accounts, and the method further comprises:

comparing the ownership verification information with the ownership verification information requirements of a first one of the plurality of financial accounts; and granting access to the first one of the plurality of financial accounts if the ownership verification information satisfies the ownership verification information requirements of the first one of the plurality of financial accounts.

7. A system for user-serviceable re-authentication for access to one or more financial accounts using a single sign on procedure, the system comprising one or more processors adapted to:

establish a user identification;

establish a user password associated with the user identification;

interface with a user terminal to present a user with pre-determined challenge questions;

interface with the user terminal to prompt the user to create one or more original answers to one or more of the pre-determined challenge questions;

associate the one or more original answers with the respective one or more pre-determined challenge questions;

provide access to the one or more financial accounts in which the one or more processors are adapted to:

interface with the user terminal to prompt the user to provide the user identification, interface with the user terminal to receive the user identification from the user, interface with the user terminal to prompt the user to provide the user password, interface with the user terminal to provide a first mode of access to the one or more financial accounts in the event the user password is received from the user, and interface with the user terminal to provide a second mode of access to the one or more financial accounts in the event the user password is not received from the user, wherein the second mode provides access to the one or more financial accounts by:

selecting at least one of the pre-determined challenge questions having an original answer associated therewith, interfacing with the user terminal to prompt the user to provide the original answer associated with the at least one of the pre-determined challenge questions, and interfacing with the user terminal to receive the original answer associated with each of the at least one selected pre-determined challenge questions from the user;

prompting the user to provide ownership verification information; and receiving the ownership verification information from the user;

wherein the one or more financial accounts comprise a plurality of financial accounts, and the one or more processors are further adapted to:

rank the relative ownership verification information requirements for each of the plurality of financial accounts based on the stringency of the ownership verification requirements for each financial account;

interface with the user terminal to receive provide the user with access to a first financial account having the most stringent ownership verification information requirements that are satisfied by the ownership verification information; and interface with the user terminal to provide the user with access to the all of the plurality of financial accounts having less stringent ownership verification information requirements than the first financial account.

8. The system of claim 7, wherein the one or more processors are adapted to:

prompt the user to create respective original answers to at least three of the pre-determined challenge questions; and randomly select and present to the user at least two of the pre-determined challenge questions having an original answer associated therewith.

9. The system of claim 7, wherein the one or more processors are further adapted to:

interface with the user terminal to prompt the user to provide one or more user-defined cue questions associated with the user password; and interface with the user terminal to receive the one or more user-defined cue questions from the user.

10. The system of claim 9, wherein the one or more processors are further adapted to providing a third mode of access to the one or more financial accounts in which the one or more processors are adapted to:

interface with the user terminal to prompt the user to provide the user identification;

interface with the user terminal to receive the user identification from the user;

interface with the user terminal to prompt the user to provide the user password;

interface with the user terminal to receive an incorrect user password from the user;

interface with the user terminal to present to the user at least one of the one or more user-defined cue questions in response to receiving an incorrect user password from the user; and interface with the user terminal to receive the user password from the user.

11. The system of claim 7, wherein the one or more processors are further adapted to:

interface with the user terminal to prompt the user to provide ownership verification information; and interface with the user terminal to receive the ownership verification information from the user.

12. The system of claim 11, wherein the one or more financial accounts comprise a plurality of financial accounts, and the one or more processors are further adapted to:

compare the ownership verification information with the ownership verification information requirements of a first one of the plurality of financial accounts; and interface with the user terminal to grant access to the first one of the plurality of financial accounts if the ownership verification information satisfies the ownership verification information requirements of the first one of the plurality of financial accounts.

13. The system of claim 7, wherein the user terminal is connected to the one or more processors by an internet.

* * * * *